Sept. 27, 1966  S. W. NAYLOR  3,274,699
UPRIGHT CROP DRYER

Filed Oct. 23, 1963  5 Sheets—Sheet 1

FIG. I

INVENTOR.
STRAUT W. NAYLOR

BY William A. Murray

ATTORNEY

INVENTOR.
STRAUT W. NAYLOR

BY *William A. Murray*

ATTORNEY

Sept. 27, 1966  S. W. NAYLOR  3,274,699
UPRIGHT CROP DRYER
Filed Oct. 23, 1963  5 Sheets-Sheet 4

FIG. 9

INVENTOR.
STRAUT W. NAYLOR
BY William A. Murray
ATTORNEY

FIG. 10

3,274,699
UPRIGHT CROP DRYER
Straut W. Naylor, 302 Miller St., P.O. Box 395,
Sterling, Ill.
Filed Oct. 23, 1963, Ser. No. 318,356
16 Claims. (Cl. 34—56)

This invention relates to a crop dryer and more particularly to the construction of and interrelation of the drying chambers of the crop dryer.

It is the primary object of the invention to provide a chamber structure for a crop dryer composed of upper and lower identical half chambers with each half chamber having inner and outer conical-shaped perforated walls concentric with and spaced from one another to define a drying compartment. Being conical-shaped, the walls forming the half chambers have a small end and a large or base end. At these ends are provided outwardly extending annular flanges that serve as connecting elements to other portions of the dryer. For example, the half chambers are mounted in base-to-base relation and the flanges at the bases are rigidly connected to form the complete chamber. In one form of the invention the chambers are stacked and the flanges at the adjacent small ends are rigidly connected.

It is a further object of the invention to fabricate the half chamber of a multitude of identical panels, all of which are relatively flexible and to interconnect the panels so that the half chamber is rigid and structurally sound.

It is still a further object of the invention to support the aforementioned chambers by posts disposed around the chamber and having supports extending inwardly to engage the flanges at the base-to-base juncture of the outer walls and to thereby suspend the entire chamber.

It is still a further object of the invention to provide the chambers in side-to-side relation, either stacked or in lateral disposition and to provide means of communication between the lower discharge end of one chamber and the upper discharge end of the next chamber.

Other objects and advantages of the invention will become apparent to those skilled in the art as the nature of the invention is better understood from the following disclosure as shown in the accompanyin drawings:

Figure 1:
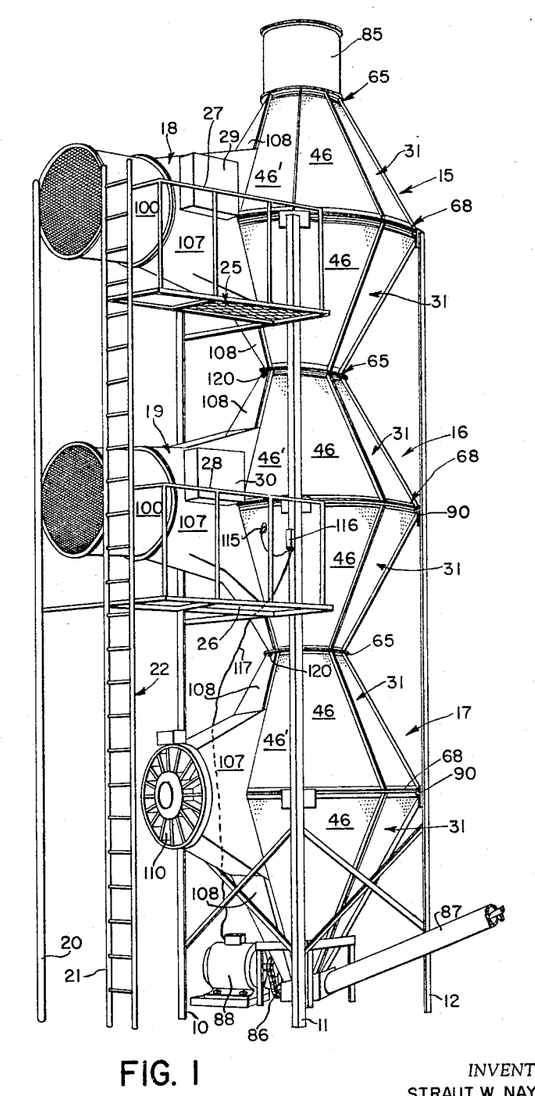
FIG. 1 is a perspective view of a complete dryer assembly.

In the first form of the invention, as shown in FIG. 1, there is provided an upright scaffold type structure that may be disposed adjacent a barn or grain shed. The structure is composed of four posts, such as at 10, 11, 12, the fourth not being visible, extending substantially the height of a three-chamber drying structure, the chambers being indicated at 15, 16 and 17. The upper chambers 15, 16 having heating devices 18, 19 extending to one side thereof and additional posts 20, 21 are provided as supports therefor. The post 21 operates as one leg of a ladder, as indicated at 22, so as to permit access to the upper chambers 15, 16. The posts 10–12 and 20, 21 are supported on the ground, concrete beddings, not shown, being provided to anchor them. Access may be had by the ladder 22 to a pair of operator's platforms 25, 26 having railings 27, 28 adjacent the upper chambers 15, 16 and adjacent the respective control panels and mechanisms contained under housings 29, 30.

Figures 2, 6, 7, 8:
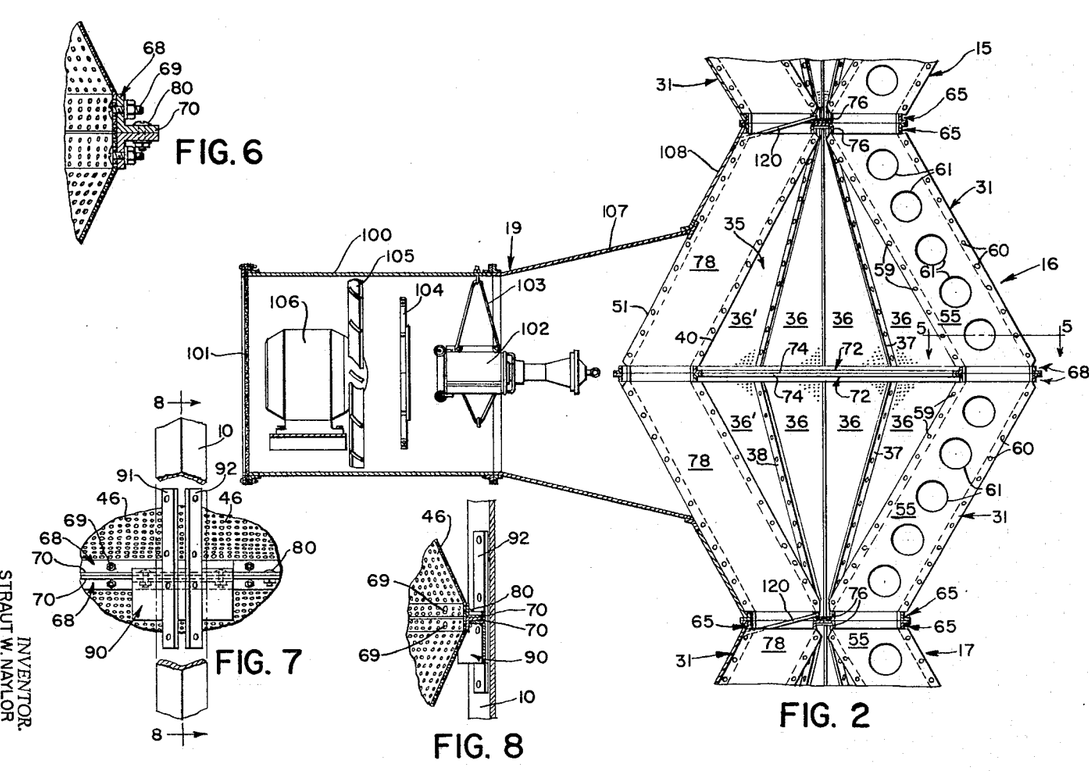
FIG. 2 is a vertical sectional view taken through the central chamber and showing portions of the upper and lower chambers.
FIG. 6 is a sectional view taken along the line 6—6 of FIG. 5.
FIG. 7 is an enlarged view of a section of a post and the adjacent support for the chamber with portions broken away.
FIG. 8 is a sectional view taken along the line 8—8 of FIG. 7.
Figure 3:
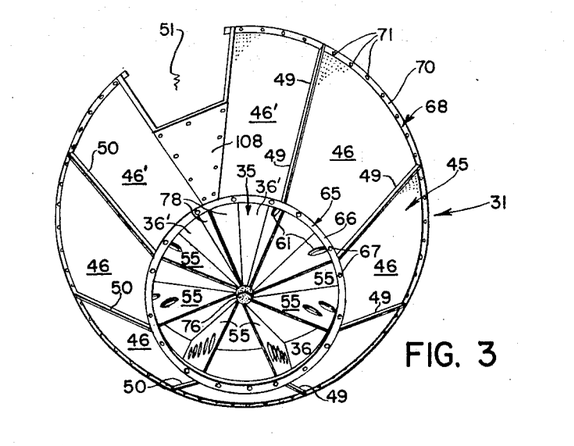
FIG. 3 is a perspective view of a half chamber and taken from the small end of the chamber.
Figure 4:
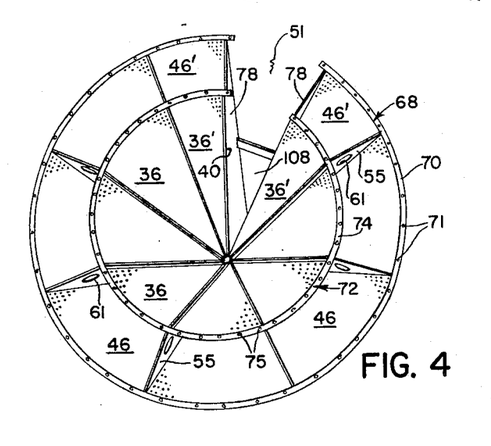
FIG. 4 is a perspective view of the half chamber as viewed from the base end of the chamber.

The drying chambers 15, 16, 17 are composed of upper and lower half chambers, identical in structure, with one being in an inverted disposition in respect to the other. Each structure is composed of an internal conical-shaped wall, indicated in its entirety at 35, composed of a series of arcuately shaped perforated panels 36 formed about the axis of the cone and having a relatively wide base and a narrow top with opposite edges extending from the top in diverging relation to the bottom and spaced apart a common angular distance throughout their length. Radially inwardly extending flanges 37, 38 are provided along the panels' side edges. The panels are formed into the substantially complete frusto-conical shape by disposing them in edge-to-edge relation with respective flanges 37, 38 lying closely adjacent one another. A side opening, as indicated at 40, is provided in each inner conical wall 35 to permit access of heated air internally thereof. The panels 36' on opposite sides of the opening 40 may be slightly larger or smaller, or the same size, as the other panels 36 forming the wall 35 depending upon the desired size of the opening 40.

An outer frusto-conical wall 45 is composed of a series of individual identical perforated and inclined panels 46 arcuate shaped and formed about the axis of the cone. Each panel 46 is substantially the height of a panel 36 and has a relatively short upper horizontal edge, a relatively wide horizontal base and a pair of side edges diverging from the top edge to the base and spaced apart a common angular distance throughout their length. Projecting from the opposite side edges are outwardly extending flanges 49, 50 respectively. The outer panels 46 are opposite respective inner panels 36 and adjacent pairs of the flanges 49, 50 on the outer panels are disposed in a radial plane through corresponding adjacent pairs of the side edge flanges 37, 38 of the inner panels 36. The panels 46 are formed into a frusto-conical wall 45 by disposing them in edge-to-edge relation so that the flanges 49, 50 of adjacent panels are closely adjacent one another. The wall 45 has a side opening 51 opposite the opening 40 of the inner wall. Panels 46' on opposite sides of the opening 51 may or may not be the same size of the other wall panels 46 depending upon the size of opening desired.

Figure 5:
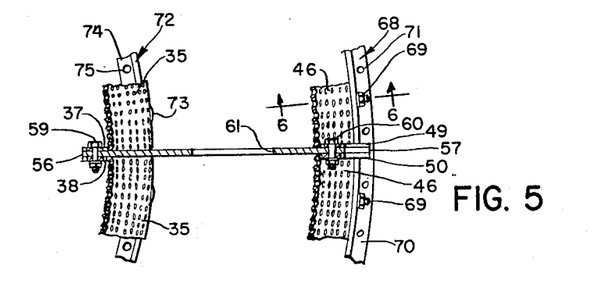
FIG. 5 is a sectional view taken along the line 5—5 of FIG. 2.

The inner and outer frusto-conical walls 35, 36 are interconnected by upright panels 55 extending across the spacing between the walls. The panels 55 have inclined edges 56, 57 that are disposed between the radially inwardly extending flanges 37, 38 of the inner wall 35 and the radially outwardly extending flanges 49, 50 of the outer wall 45. The edge 56 and flanges 37, 38 are rigidly fixed by bolts 59 and the edge 57 and flanges 49, 50 are rigidly fixed by bolts 60. When so fixed, the entire structure becomes rigid. The upright panels 55 divide the spacing between the walls 35, 45 into compartments. A series of vertically spaced holes 61 are provided in the panels 55 to permit communication between the compartments.

The upper horizontal edges of the panels 46 are rigidly interjoined by an annular ring 65, substantially L-shaped in cross section, having a vertical flange fixed to the outer surfaces of the panels 46 and a horizontal flange 66 projecting outwardly from the edges of the panels 46. The flange 66 has angularly spaced apart holes 67 therein. A complete annular ring 68, except for the width of the side opening 51, is provided to join the bases of the panels 46. The ring 68 is substantially L-shaped in cross section and may be bolted, as at 69, to the outer surfaces of the panels 46. The ring 68 has an outwardly projecting horizontal flange 70 projecting from the base of the panels and having angularly spaced holes 71 therein.

A complete annular ring 72, except for the opening 40, interjoins the base edges of the inner panels 46. The ring 72 is detachably supported on the inner surface of the panels by bolts 73 and has an inwardly projecting horizontal flange 74 with holes 75 uniformly spaced apart around the flange. As may be seen from viewing the drawings, the flanges 74 and 70 are horizontally coplanar.

A metal cap 76 is provided atop the upper ends of the panels 36 and interjoins those panels. The cap may be perforated and has a surface substantially coplanar with the flange 66 of the ring 65.

Adjacent the side openings 40, 51 of the conical walls 35, 45 and extending from and interjoining the edges forming the openings, are imperforate panels 78 that form a tunnel through the spacing between the walls 35, 45.

The half chambers 31 are formed into the complete chambers as shown, for example, as chambers 15, 16 and 17, by connecting the half chambers 31 at their bases by aligning holes 71, in adjacent ledges or flanges 70 and holes 75 in adjacent ledges or flanges 74 and fixing the ledges together by bolts 80. When fixed in this manner, the small end of the upper half chamber becomes the inlet and the small end of the inverted or lower half chamber becomes the outlet for grain gravitating through the chamber.

Chambers may be stacked in the manner shown in FIG. 1 or in vertical stacked relation by aligning holes 67 and bolting the horizontal flanges 66 of the annular rings 65 at the lower outlet end of one chamber to the upper inlet end of a lower chamber to thereby provide means effecting communication between adjacent chambers.

Grain hoppers such as at 85, 86 may also be connected to the rings 65 at the extreme upper end and at the lower end of the stack of chambers respectively. The lower hopper 86 guides grain into a discharge elevator as indicated at 87. A motor 88 operates the elevator 87.

Corner supports 90 for each of the chambers 15, 16 and 17 are provided on the posts 10, 11 and 12 and the one not shown. The supports are composed of a pair of upright metal straps 91, 92 that may be bolted to the inside faces of the angle iron post 10, as viewed in FIGS. 7 and 8. Fixed to the straps 91, 92 is an upright arcuate shaped plate 93 having a laterally outwardly extending shelf 94 engaging the underside of the ledges or flanges 70 and is bolted thereto by the bolts 80. By such an arrangement, the corner posts operate as vertical supports for suspending the chambers, and the rings 68 at the base of the half chambers 31 offer structural interconnection between the respective posts.

The heating units 18, 19 are of conventional design and may be of the type shown and described in U.S. Patent 3,050,111 that issued to W. L. Hubbard, August 21, 1962.

Each heating unit includes a cylindrical casing 100 with grating 101 at one end opening to the atmosphere. Supported in the casing 100 is a burner 102 suspended by hangers 103 from the internal surface of the casing directing a blast of heat and flame outwardly toward a deflector plate 104. Between the deflector plate 104 and grate 101 is a fan composed of fan blades 105 and motor 106 that directs the heat toward the opposite end of the cylinder casing 100. Styling 107, formed to a round opening at one end for connection to the casing 100, and formed to the shape of the openings 51 at the opposite end, extends from the burner to tunnels formed by the panels 78 so that heated air will be forced internally of the conical inner walls 35 through the perforated panels 36 into and through the drying compartments and chambers formed by the walls 35, 45. Imperforate panels 108 are above and below the styling 107 and closed the remainder or small ends of the openings 51. In effect, therefore, the inner walls 35 become a plenum chamber for the dryer.

The lower unit 17 is provided with a blower 110 directing cool air internally of the chamber formed by the walls 35, a styling structure 107 also being provided to connect the blower to the tunnel formed by the panels 78 in the drying unit 17.

Provided in the central drying unit 16 is a temperature sensing device indicated by its connection 115 to the lower casing wall 45 that measures the temperature of the material in the crop drying compartments. The sensing device is connected to a thermostat 116 in turn connected by a wire 117 to the motor 88. Consequently the motor 88 and elevator 87 operate in response to the temperature of the grain in the lower portion of the central drying unit 16.

When grain is passed through the compartments, chaff and small particles of grain and foreign matter will pass through the openings in the perforated panels 36 and will collect at the base or lower portion of the lower internal casing 35. Periodically a foreign particle will be forced into the plenum chamber by the fan 105 and will often be in a glowing or burning state sufficiently to start a fire in the accumulated chaff and grain. In order to prevent such, a clean out means in the form of a pipe or conduit 120 extends from the cap 76 at the lower end of the drying units through the drying chambers and the outer casing wall 45. The pipe 120 will permit the chaff and small particles to be blown out of the plenum chamber and accumulation will not occur.

In operation, the structure shown in FIG. 1 will normally be disposed within or closely adjacent a grain bin. Grain will be delivered into the units via the upper hopper 85 by suitable conveyors, not shown. The grain will gravitate through the drying compartments of the units until all three units are filled. In normal operation, the upper heating unit 18 will move air into the plenum chamber of the first or upper drying unit 15 at 190° to 200° F. The drying unit 19 will move air into the plenum chamber of the central drying unit at 160° to 170°. The blower 110 on the lower unit 17 will cool the grain prior to its being discharged by the elevator 87. Thermostat 116 may be adjusted at a given range around a predetermined temperature. For example when corn reaches 110°, it may be assumed the moisture content is 13% or lower and consequently considered sufficiently dry for cooling. Therefore if the thermostat is set at 110°, the motor 88 will operate the elevator 87 when the temperature within the lower compartments of unit 16 reaches this temperature. In initial operation it will be necessary to start the upper heater 18 prior to the heater 19 and blower 110 and to move the grain initially in the units 16 and 17 back into the grain bin until the grain in the upper unit 15 is in the unit sufficient time to pass into the central unit 16.

It should be recognized that the present structure will operate advantageously even if a single drying unit, such as 15 or 16, is used in combination with hoppers 85, 86 and a discharge elevator 87. There will not be a continuous cycle that occurs in the three stacked units. However one unit, as above described, could provide the three portions of the cycle, the three being the high temperature drying, the lower temperature drying and the cooling. By having the identical half chambers 31 adapted for interchange and interconnection, units may be added as both the need arises and finances permit. Consequently, a complete drying assembly as shown in FIG. 1 may be incorporated as a long range plan spread over several years with units being added periodically.

Figure 9:
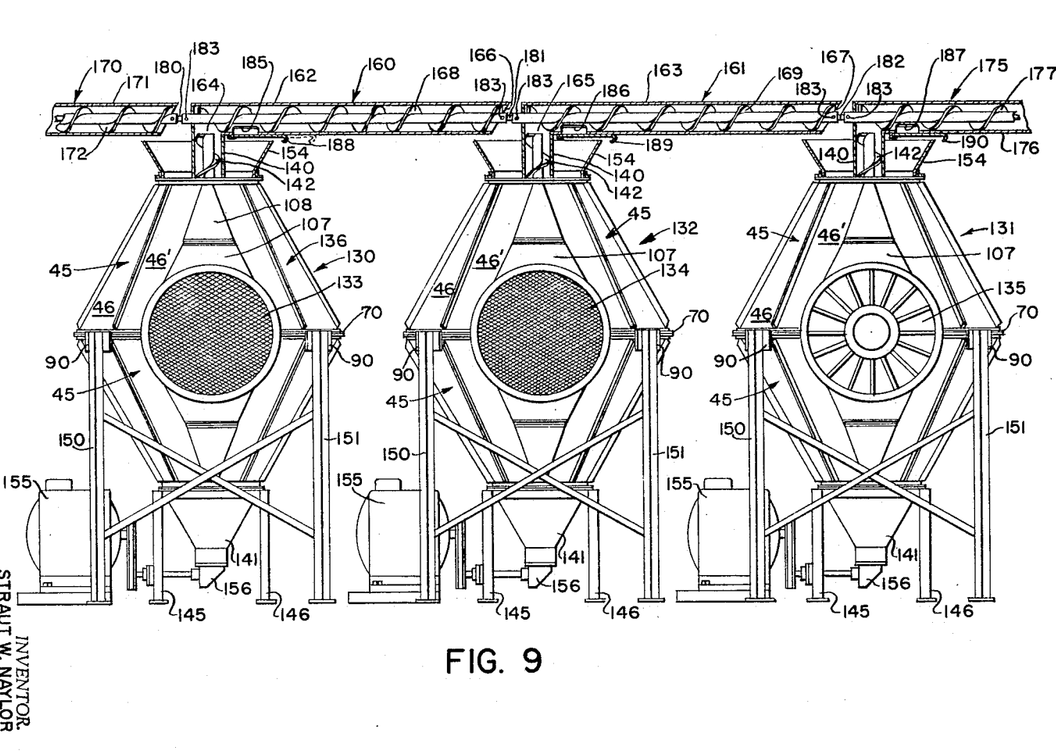
FIG. 9 is a front view, partially in section, of a modified form of the invention.
Figure 10:
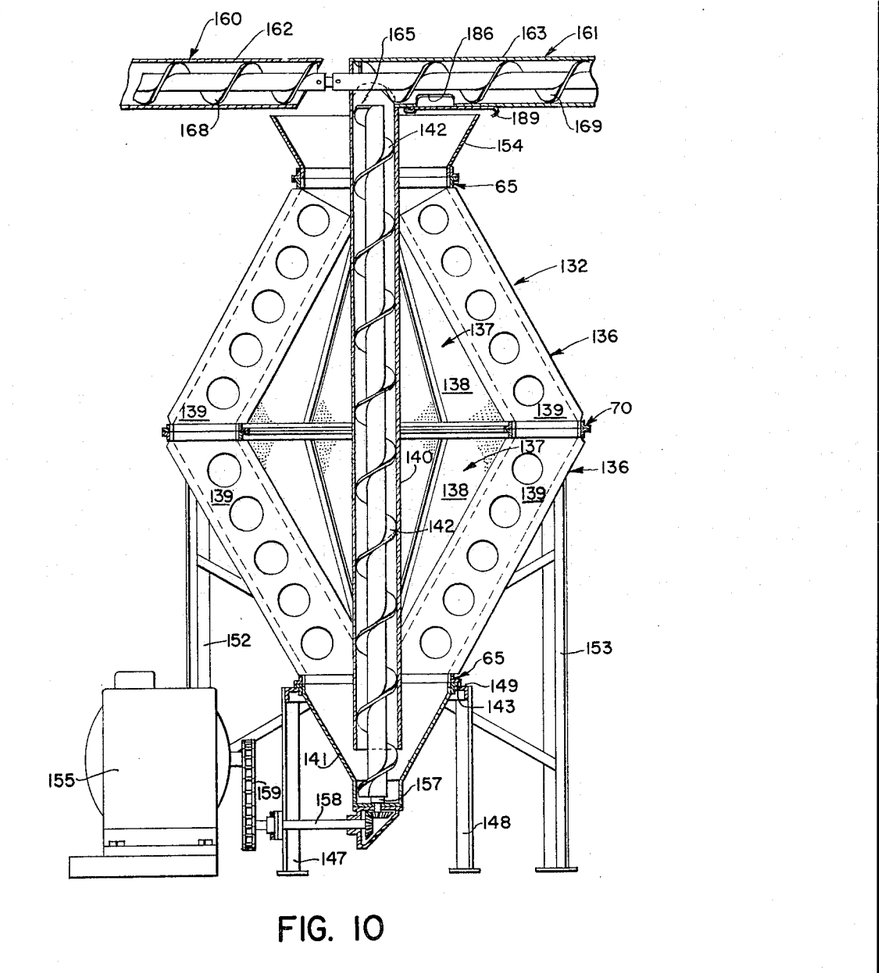
FIG. 10 is a vertical sectional view of the portion of the invention shown in FIG. 9.

In the modified form of the invention, as shown in FIGS. 9 and 10, first and second drying units 130, 131 are disposed on opposite sides of a central unit 132. The units 130, 132 are identical and are provided with heating units 133, 134 respectively of the type described in the aforementioned form of the invention. The second drying unit 131 is provided with a blower 135. As provided in the previous form, the upper and lower halves 136 of the drying chambers are identical and are interconnected in the manner previously described. The outer conical wall 45 is similar to the one previously described. The inner conical wall 137 has identical panels 138 interconnected at their base in a manner previously described and when interconnected, extending to upper and lower horizontal annular edges accommodating an upright auger housing 140. Upright compartment-separating walls 139 are also modified slightly to accommodate the slightly modified inner wall panels 138. The auger housing terminates at its lower end in a hopper 141 having an upper annular flange 143 fixed to the lower annular flange 65. An auger 142, disposed in the auger housing 140 has a lower exposed end in the hopper 141. The hopper and consequently the lower end of the respective drying unit is supported on posts 145, 146, 147, 148 having a rigid annular ring 149 underlying and connected to the annular flanges 143, 65. Upwardly opening round hoppers 154 extend upwardly and are connected to the upper annular flanges 66 of the rings 65 atop the drying units 130–132.

Additional supports for the chambers are provided by corner posts 150, 151, 152, 153 supported on the ground and having corner supports 90 underlying and carrying the horizontal flanges 70 of the outer frusto-conical walls 45.

The augers 142 are driven from their lower ends by electric motors 155 through bevel gear transmissions 156 connected to the auger shafts 157 and horizontal drive shafts 158, the latter being responsive to chain drives 159 driven by the motor 155.

Overhead horizontal conveyors 160, 161 extend between the upper hoppers 154 of the first drying unit 130 and the central unit 132 and between the central unit 132 and the second unit 131, respectively. The conveyors 160, 161 are composed of auger housings 162, 163 having intake openings 164, 165 communicating directly with the upper ends of the vertical auger housings 140 in the respective drying units 130, 132. Conveyors 160, 161 have discharge ends 166, 167, respectively, discharging material into the upper hoppers 154 of the respective drying units 132, 131. The housings 162, 163 contain auger flightings 168, 169, respectively.

A material feeding conveyor, shown partially at 170, has a conveyor housing 171 and an auger 172 therein. The conveyor 170 receives material to be dried from a grain bin or other storage container, which is not shown and discharges it into the hopper 154 atop the first drying unit 130. A discharging conveyor 175, including a housing 176 and auger 177 receives material from the upper end of the auger housing 140 of the second or cooling unit 131 and delivers it to a trailer or other grain container, not shown.

The auger flightings 172, 168, 169 and 177 are drivingly interconnected by shafts 180, 181 and 182 extending between adjacent ends of the flightings. The respective flightings are connected to the shafts 180–182 by removable pins 183. Consequently, by removing the proper pin 183, any of the auger flightings 168, 169, 177 may become disengaged and consequently ineffective.

The auger housings 162, 163, 176 are provided with openings 185, 186, 187 adjacent their intake ends and above the hoppers 154. The openings are normally closed by sliding doors or gates 188, 189, 190 respectively. However, these gates may be opened to permit recirculation in the respective drying units.

The modified form of the invention operates in the following manner. In filling the units, grain is fed first into the initial unit 130 from the conveyor 170. The pin 183 connecting the auger flighting 168 from the shaft 180 may be removed if it is desired not to run the auger 168 in a dry or unfilled housing. Following filling of the chambers 136 of the unit 130, the burner 133 is started to initially dry the grain. The burner 133 is a high temperature burner and moves air into the plenum chamber in a range of 190° to 200° F. Following the initial drying, the motor 155 of the unit 130 is started, the flighting 168 is engaged with the shaft 180, and the grain is moved into the central unit 132 and the unit 130 is filled with fresh grain. The burner 134 is started and the grain is dried in its second stage by air moving into the plenum chamber in a range of 160° to 170°. Again the pins 183 engaging the auger flighting 169 to the shaft 166 may be removed to prevent the auger from operating in the unfilled housing 163. Upon the grain in the central unit 132 reaching a desired degree of drynes, it may be transferred by the central auger 142 and conveyor 163 to the second unit 131. Once all three units are filled as above described and sufficient cooling occurs in the unit 131, the flow of grain to and between the units 130, 131, 132 is continuous. If for any reason it is desired to recirculate the grain in a unit, the respective gates 188, 189, 190 may be opened and the grain from the bottom of the unit will be recirculated to the top of the unit.

While only one modification of the invention has been shown it should be recognized that other forms of the invention will occur to those skilled in the art. Therefore while the preferred forms were shown and described in concise and detailed manner for the purpose of clearly and concisely illustrating the invention, it was not the intention to limit or narrow the invention beyond the broad concepts set forth in the appended claims.

What is claimed is:

1. A crop dryer comprising: a plurality of vertically disposed drying chambers including a central chamber and first and second chambers on opposite sides thereof, each chamber being composed of an inner wall structure formed by upper and lower conical-shaped perforated walls extending coaxially and in base-to-base disposition so as to have small upper and lower ends, and outer wall structure formed of upper and lower frusto-conical perforated walls in base-to-base disposition concentric with and spaced uniformly from the inner walls with upper and lower ends horizontally coplanar with the upper and lower ends of the inner walls so as to define therewith an upper material intake and a lower material discharge; means effecting communication between the intake of the central drying chamber and a discharge of the first drying chamber and between the discharge of the central chamber and the intake of the second chamber whereby material may move from the first to the central and from thence to the second drying chamber; air heating apparatus including blower means supported on the first and central chambers outboard of the outer walls and having communication internally of the respective inner wall structures whereby heated air may be forced from internally of the inner walls externally through the inner and outer walls; a blower associated with the second chamber having internal communication with its inner walls and effective to move cold air outwardly through the inner and outer walls; a discharge conveyor for moving material from the discharge of the second chamber; a power unit for operating the discharge conveyor; and a temperature responsive control device for starting and stopping the power unit and having temperature sensing elements in the central chamber between the inner and outer wall structures for controlling the discharge of material by the conveyor in response to the temperature of material in the central chamber.

2. A crop dryer comprising: a plurality of vertically stacked drying chambers including a central chamber and a first upper and a second lower chamber on the upper and lower sides of the central chamber, each chamber being composed of an inner wall structure formed by upper and lower conical-shaped perforated walls extending coaxially and in base-to-base disposition so as to have small upper and lower ends, and outer wall structure formed of upper and lower frusto-conical perforated walls in base-to-base disposition concentric with and spaced from the inner walls with uniform upper and lower annular ends defining an upper material intake and a lower material discharge respectively; means connecting the annular intake of the central drying chamber and the annular discharge of the first drying chamber and the annular discharge of the central chamber and the annular intake of the second chamber whereby material may gravitate from the first to the central and from thence to the second drying chamber; air heating apparatus including blower means supported on the first and central chambers outboard of the outer walls and having communication internally of the respective inner wall structures whereby heated air may be forced from internally of the inner walls externally through the inner and outer walls; a blower associated with the second chamber having internal communication with its inner walls and effective to move relatively cool air outwardly through the inner and outer walls; a discharge conveyor for moving material from the discharge of the second chamber; a power unit for operating the discharge conveyor; and a temperature responsive control device for starting and stopping the power unit and having temperature sensing elements in the central chamber between the inner and outer wall structures for controlling the discharge of material by the conveyor in response to the temperature of material in the central chamber.

3. A crop dryer comprising: a plurality of vertically stacked drying chambers including a central chamber and a first upper and a second lower chamber on the upper and lower sides of the central chamber, each chamber being composed of an inner wall structure formed by upper and lower conical-shaped perforated walls extending coaxially and in base-to-base disposition so as to have small upper and lower ends, and outer wall structure formed of upper and lower frusto-conical perforated walls in base-to-base disposition concentric with and spaced from the inner walls with uniform upper and lower annular ends defining an upper material intake and a lower material discharge respectively; means connecting the annular intake of the central drying chamber and the annular discharge of the first drying chamber and the annular discharge of the central chamber and the annular intake of the second chamber whereby material may gravitate from the first to the central and from thence to the second drying chamber; air heating apparatus including blower means supported on the first and central chambers outboard of the outer walls and having communication internally of the respective inner wall structures whereby heated air may be forced from internally of the inner walls externally through the inner and outer walls; a blower associated with the second chamber having internal communication with its inner walls and effective to move relatively cool air outwardly through the inner and outer walls; a discharge conveyor for moving material from the discharge of the second chamber; and a power unit for operating the discharge conveyor.

4. A crop dryer comprising: a plurality of vertically stacked drying chambers, each chamber being composed of an inner wall structure formed by upper and lower conical-shaped perforated walls extending coaxially and in base-to-base disposition so as to have small upper and lower ends, and outer wall structure formed of upper and lower conical-shaped perforated walls in base-to-base disposition concentric with and spaced from the inner walls with uniform upper and lower annular ends defining an upper material intake and a lower material discharge respectively; means connecting the adjacent annular ends of the respective chambers whereby material may gravitate from the upper to the lower of the stacked chambers; air treating apparatus including blower means supported on the chambers outboard of the outer walls and having communication internally of the respective inner wall structures whereby air may be forced from internally of the inner walls externally through the inner and outer walls; a discharge conveyor for moving material from the discharge of the lowest chamber; and a power unit for operating the discharge conveyor; and a temperature responsive control device for starting and stopping the power unit and having temperature sensing elements in one of the chambers between the inner and outer wall structures for controlling the discharge of material by the conveyor in response to the temperature of material in the respective chamber.

5. A crop dryer comprising: a plurality of vertically stacked drying chambers, each chamber being composed of an inner wall structure formed by upper and lower conical-shaped perforated walls extending coaxially and in base-to-base disposition so as to have small upper and lower ends, and outer wall structure formed of upper and lower conical shaped perforated walls in base-to-base disposition concentric with and spaced from the inner walls with uniform upper and lower annular ends defining an upper material intake and a lower material discharge respectively; means connecting the adjacent annular ends of the respective chambers whereby material may gravitate from the upper to the lower of the stacked chambers; air treating apparatus including blower means supported on the chambers outboard of the outer walls and having communication internally of the respective inner wall structures whereby air may be forced from internally of the inner walls externally through the inner and outer walls; and a discharge conveyor for moving material from the discharge of the lowest chamber.

6. A crop dryer comprising: vertically disposed drying chambers laterally spaced apart and including a central chamber and first and second chambers at sides thereof, each chamber being composed of a central wall structure formed by upper and lower conical-shaped perforated walls extending coaxially and in base-to-base disposition so as to have small upper and lower ends, and outer wall structure formed of upper and lower conical-shaped perforated walls in base-to-base disposition concentric with and spaced from the inner walls with upper and lower ends spaced from the upper and lower ends of the inner walls; an axially extending conveyor in each of the chambers including an auger housing and auger therein extending from a lower intake end adjacent the lower ends to an upper outlet end adjacent the respective upper ends; laterally extending conveyors effecting communication between the upper end of the central drying chamber and the upper outlet of the first drying chamber and between the upper outlet of the vertically extending conveyor of the central chamber and the upper end of the second chamber whereby material may move from the first to the central and from thence to the second drying chamber; air heating apparatus including blower means therein supported on the first and central chambers outboard of the outer walls and having communication internally of the respective inner wall structures whereby heated air may be forced from internally of the inner walls externally through the inner and outer walls; a blower associated with the second chamber having internal communication with its inner walls and effective to move cold air outwardly through the inner and outer walls; a discharge conveyor for moving material from the upper outlet of the axial conveyor of the second chamber; and means delivering material to the upper end of the first chamber.

7. A crop dryer comprising: vertically disposed laterally spaced apart drying chambers including initial and final drying chambers, each chamber being composed of a central wall structure formed by upper and lower conical-shaped perforated walls extending coaxially and in base-to-base disposition so as to have small upper and lower ends, and outer wall structure formed of upper and lower conical-shaped perforated walls in base-to-base disposition concentric with and spaced from the inner walls with upper and lower ends spaced from the upper and lower ends of the inner walls; an axially extending conveyor in each of the chambers including an auger housing and auger therein extending from a lower intake end adjacent the lower ends to an upper outlet end adjacent the respective upper ends; laterally extending conveyors effecting communication between the outlet of one and the upper end of the other of adjacent chambers; air treating apparatus including blower means therein supported on the chambers outboard of the outer walls and having communication internally of the respective inner wall structures whereby heated air may be forced from internally of the inner walls externally through the inner and outer walls; a discharge conveyor for moving material from the upper outlet of the axial conveyor of the final drying chamber; and means delivering material to the upper end of the initial drying chamber.

8. A crop dryer comprising: a vertically disposed drying chamber composed of an inner wall structure formed by identical upper and lower conical-shaped perforated walls extending coaxially and in base-to-base disposition so as to have small upper and lower ends, and outer wall structure formed of identical upper and lower conical-shaped perforated walls in base-to-base disposition concentric with and spaced uniformly from the inner walls with upper and lower ends substantially on the level with the upper and lower ends of the inner walls, the upper and lower ends of the outer walls defining an annular upper material intake and lower material discharge respectively; angularly spaced upright panel elements between the inner and outer walls and disposed radially in respect to the axis of the walls between the upper and lower ends of the chamber effecting rigidity between the structures; an upright tunnel extending between openings in the inner and outer wall structures and formed of imperforate panels to thereby close the tunnel except for the openings in the inner and outer wall structures; and air treating apparatus including blower means on the chamber outboard of the outer walls and having communication internally of the respective inner wall structure via the tunnel whereby air may be forced from internally of the inner wall externally through the inner and outer walls.

9. A crop dryer comprising: a vertically disposed drying chamber composed of an inner wall structure formed by upper and lower conical-shaped perforated walls extending coaxially and in base-to-base disposition so as to have small upper and lower ends, and outer wall structure formed of upper and lower conical-shaped perforated walls with a base-to-base juncture and disposed concentric with and spaced uniformly from the inner walls with upper and lower ends substantially on the level with the upper and lower ends of the inner walls, the upper and lower ends of the outer walls defining an annular upper material intake and lower material discharge respectively; angularly spaced upright panel elements between the inner and outer walls and disposed radially in respect to the axis of the walls between the upper and lower ends of the chamber effecting rigidity between the structures; air treating apparatus including blower means on the chamber outboard of the outer walls and having communication internally of the respective inner wall structure whereby air may be forced from internally of the inner wall; an outwardly extending ledge rigid with the outer wall structure externally of the inner and outer walls adjacent the juncture; a plurality of upright support posts spaced around the chamber; and support means between the posts and ledge effecting a suspension of the chamber on the posts.

10. An upright drying chamber structure for a crop dryer comprising: a series of inner perforated panels arcuately formed about an upright axis, each inner panel having a relatively wide base and a relatively narrow top with opposite side edges spaced apart at a common angular distance to diverge from the top to the base, said inner panels being disposed annularly in edge-to-edge relation to define a conical-shaped inner wall with an open side therein, and inwardly extending flanges projecting radially from the side edges and base of the inner planels; an external upright conical-shaped external wall with an open side therein opposite to the aforesaid open side substantially of the same height as the inner wall, and formed about the axis of the inner conical-shaped wall and spaced uniformly therefrom, said external wall being composed of a series of perforated outer panels, each of the latter panels having a relatively short horizontal upper end, a relatively long horizontal base and side edges spaced apart at the aforesaid common angular distance to diverge from the upper end to the base, and outwardly extending flanges at the upper end, base, and side edges of the outer panels, the flanges of the side edges of the outer panels being radially coplanar with corresponding side edge flanges of the inner panels; upright panels traversing the spacing between the inner and outer walls and having opposite inclined edges adjacent and between the adjacent side edge flanges of the inner and outer panels and defining with the latter a series of upright compartments, means rigidly connecting the edges of upright panels to the adjacent side edge flanges of the inner and outer panels; and imperforate panel structure extending between the edges of the open sides in the inner and outer walls to form a tunnel through the spacing between the walls.

11. An upright drying chamber structure for a crop dryer comprising: a series of inner perforated panels arcuately formed about an upright axis, each inner panel having a relatively wide base and a relatively narrow top with opposite side edges diverging from the top to the base, said inner panels being disposed annularly in edge-to-edge relation to define a conical-shaped inner wall with an open side therein, and flanges projecting radially from the side edges of the inner panels; an external upright conical-shaped wall with an open side therein opposite to the aforesaid open side, and formed about the axis of the inner conical-shaped wall and spaced therefrom, said external wall being composed of a series of perforated outer panels, each of the later panels having a relatively short horizontal upper end, a relatively long horizontal base and side edges divering from the upper end to the base, and flanges at the upper end, base, and side edges of the outer panels, the flanges of the side edges of the outer panels being radially coplanar with corresponding side edge flanges of the inner panels; upright panels traversing the spacing between the inner and outer walls and having opposite inclined edges adjacent and between the adjacent side edge flanges of the inner and outer panels and defining with the latter a series of upright compartments, means rigidly connecting the edges of the upright panels to the adjacent side edge flanges of the inner and outer panels; and imperforate panel structure extending between the edges of the open sides in the inner and outer walls to form a tunnel through the spacing between the walls.

12. An upright drying chamber structure for a crop dryer comprising: an inner perforated conical-shaped wall with an open side therein and having a large base and small top; an inwardlly extending flange projecting from the base; an external upright conical-shaped perforated wall with an open side therein opposite to the aforesaid open side, and formed about the axis of the inner conical shaped wall and spaced therefrom, and having a relatively small annular upper end and a relatively large horizontal base; and outwardly extending flanges at the upper end and base; radially extending upright panels traversing the spacing between the inner and outer walls and having opposite inclined edges fixed to the inner and outer walls and defining therewith a series of upright compartments, said upright panels having openings therein for affording communication between the compartments; and imperforate panel structure extending between the edges of the open sides in the inner and outer walls to form a tunnel through the compartment area of the structure.

13. An upright drying chamber structure for a crop dryer comprising: an inner perforated conical-shaped wall; having a large base and small top; an inwardly extending flange projecting from the base; an external upright conical-shaped perforated wall formed about the axis of the inner conical-shaped wall and spaced therefrom, and having a relatively small annular upper end and a relatively large horizontal base; and outwardly extending flanges at the upper end and base; radially extending upright panels traversing the spacing between the inner and outer walls and having opposite inclined edges fixed to the inner and outer walls and defining therewith a series of upright compartments, said upright panels having openings therein for affording communication between the compartments.

14. The invention defined in claim 13 in which the flanges on the bases are horizontally coplanar and further characterized by connecting means on the flanges affording a connection to the other portions of a crop dryer.

15. A crop dryer comprising: vertically disposed stacked drying chambers including a lower crop cooling chamber and an upper crop heating chamber, each chamber being composed of an inner wall structure formed by upper and lower conically shaped perforated walls extending coaxially and in base-to-base disposition so as to have small upper and lower ends, and an outer wall structure formed of upper and lower frusto-conical perforated walls in base-to-base disposition concentric with and spaced from the inner wall with upper and lower annular ends defining an upper material intake and a lower material discharge respectively, means connecting the upper annular end of the lower cooling chamber to the lower annular end of the upper heating chamber whereby material may gravitate from the upper to the lower of the stacked chambers, said inner and outer wall structure of each chamber having openings at one side thereof and imperforate duct means extending between the inner and outer wall structures, air heating and blower means connected to the duct means of the upper chamber for passing heated air into the inner wall structure of the upper chamber for passage therefrom outwardly through the perforated inner and outer wall structures, and blower means connected to the duct means of the lower chamber for passing air into the inner wall structure of the lower chamber for passage outwardly therefrom through the inner and outer wall structures of the lower chamber.

16. A crop dryer comprising: a vertically disposed drying chamber composed of an inner wall structure formed by upper and lower conically shaped inner perforated walls extending coaxially and in base-to-base disposition so as to have small upper and lower ends, and an outer wall structure formed by upper and lower frusto-conical perforated outer walls in base-to-base disposition concentric with and spaced from the inner wall structure with upper and lower annular ends defining an upper material intake and a lower material discharge respectively, said upper and lower conically shaped inner walls having openings in the side thereof extending from adjacent the respective upper and lower ends to the base thereof and being relatively wider at the base, duct means including imperforate panels extending between the inner and outer walls alongside said openings in the inner walls, said panels diverging relative to each other in a direction from the ends toward the base of the respective inner walls, said outer walls having openings therein between said imperforate panels, and blower means disposed externally of said outer wall structure and communicating with said duct means for passing air into the inner wall structure for passage outwardly therefrom through the inner and outer wall structures.

References Cited by the Examiner

UNITED STATES PATENTS

| | | | |
|---|---|---|---|
| 534,030 | 2/1895 | Caine | 34—174 |
| 1,341,676 | 2/1920 | Robert | 34—174 |
| 2,636,575 | 4/1953 | Watson | 34—65 X |
| 3,050,111 | 8/1962 | Hubbard et al. | 158—28 |
| 3,078,590 | 2/1963 | Batterton et al. | 34—174 X |
| 3,092,472 | 6/1963 | Figley | 34—56 |

FOREIGN PATENTS

| | | |
|---|---|---|
| 558,507 | 6/1944 | Great Britain. |

FREDERICK L. MATTESON, JR., *Primary Examiner.*

JOHN J. CAMBY, *Examiner.*